United States Patent [19]

Greeley, Jr.

[11] 4,055,788

[45] Oct. 25, 1977

[54] MOTOR CONTROL CIRCUIT

[75] Inventor: William Hancock Greeley, Jr., Marblehead, Mass.

[73] Assignee: The Gillette Company, Boston, Mass.

[21] Appl. No.: 632,870

[22] Filed: Nov. 17, 1975

[51] Int. Cl.$^2$ .............................................. G05B 5/01
[52] U.S. Cl. .................................... 318/624; 318/677; 328/147
[58] Field of Search ......................... 318/624, 666, 677; 328/142, 143, 135, 146, 147; 307/235 N; 331/108, 65

[56] References Cited

U.S. PATENT DOCUMENTS

| 3,657,660 | 4/1972 | Pfersch | 328/148 |
| 3,704,404 | 11/1972 | Iversen | 318/624 |
| 3,805,184 | 4/1974 | Visioli, Jr. et al. | 331/108 D |
| 3,873,853 | 3/1975 | Ahmed | 307/235 N |

Primary Examiner—Robert K. Schaefer
Assistant Examiner—John J. Feldhaus
Attorney, Agent, or Firm—Richard A. Wise; Oistein J. Bratlie; Donald E. Mahoney

[57] ABSTRACT

A motor control circuit is arranged to provide selected control signals for operating a motor to rotate a motor shaft in a predetermined direction until the motor control circuit provides a high frequency control signal for substantially stopping motor operation.

11 Claims, 3 Drawing Figures ns and multiple leads coupling the circuit 10 com-
MOTOR CONTROL CIRCUIT

BACKGROUND OF THE INVENTION

1. Field of the Invention

This invention relates to motor control circuits and, more particularly, to motor control circuit signals for operating a motor to rotate a shaft in a predetermined direction until the motor circuit provides a high frequency control signal for substantially stopping motor operation.

2. Description of the Prior Art

Control circuits for a reversible motor have included a pair of Triacs which are switched into operation by signals derived from a controller circuit, whereby, activation of one Triac causes a motor shaft to rotate in a clockwise direction and activation of the other Triac causes the motor shaft to rotate in a counter-clockwise direction. The controller circuit included means for providing a signal for activating a selected Triac. For example, prior art controller circuits included a difference amplifier having a first input terminal coupled to a transducer and a second input terminal coupled to a variable reference signal. The transducer is arranged to sense an angular displacement to the motor shaft from a reference position and to provide a corresponding electrical signal to the first input terminal of the difference amplifier. The output signal from the difference amplifier is proportional to the difference in magnitude between the reference and transducer electrical signals. Relatively complex and expensive circuitry convert the differential amplifier output signal into control signals suitable for operating a selected Triac. No output signal is provided by the difference amplifier when the magnitude of the reference and transducer electrical signals are substantially equal. The motor is inoperative in the absense of a difference amplifier output signal.

It is therefore desirable to arrange relatively simple circuitry to form a control circuit to provide suitable signals for operating a reversible motor.

SUMMARY OF THE INVENTION

A motor control circuit is arranged to control operation of a reversible motor having a shaft and motor control windings. Position transducer means are coupled to the motor shaft and arranged to provide an output electrical signal proportional to an angular position of the motor shaft relative to a reference motor shaft position. Comparator means having first and second input terminals and an output terminal are arranged to compare amplitude of a reference signal coupled to the comparator first input terminal with amplitude of the position transducer output electrical signal coupled to the comparator second input terminal to provide a motor direction control signal at the comparator output terminal. Feedback means are coupled between the comparator second terminal and the comparator output terminal to cause the comparator to provide a high frequency output signal for stopping the motor operation when a difference in magnitude between the transducer and reference signals is substantially equal to a predetermined magnitude. Motor direction control means are coupled between the comparator output terminal and the motor control windings to generate motor control signals in response to the comparator means output signal.

DESCRIPTION OF THE PREFERRED EMBODIMENT

Figure 1:
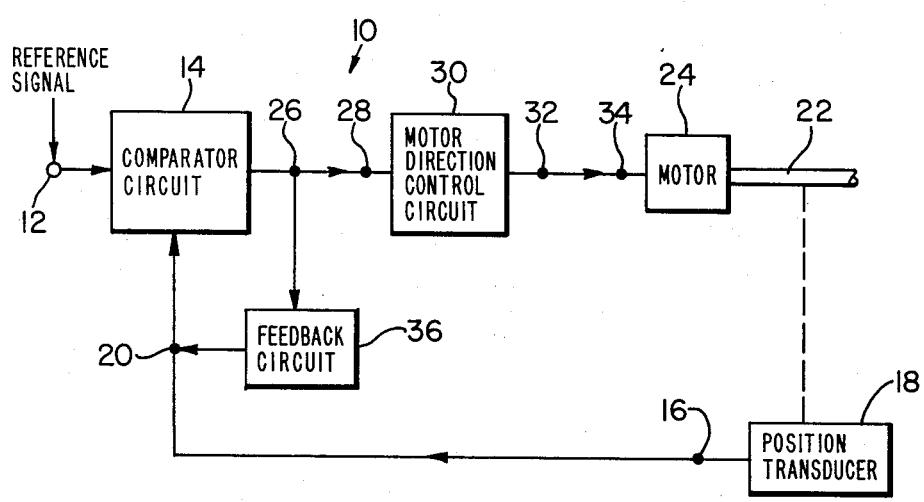
FIG. 1 is a block diagram of a motor control circuit illustrating the principles of the present invention.

Referring to FIG. 1, there is shown a block diagram of a motor control circuit 10 illustrating the concept of the present invention. All ground connections, power supplies, and multiple leads coupling the circuit 10 components together and necessary for proper operation of the motor control circuit 10 are not shown, but will be readily understood by those skilled in the art.

A veriable reference signal from an electrical source, not shown, is coupled to a first input terminal 12 of a comparator circuit 14. An electrical signal from an output terminal 16 of a suitable position transducer 18 is coupled to a second input terminal 20 of the comparator circuit 14. The position transducer 18 is serially connected between a drive shaft 22 of a reversible motor 24 and the second input terminal 20 of the comparator circuit 14. The position transducer 18 is arranged, as known in the art, to respond to mechanical motion of the motor shaft 22 to provide an electrical signal corresponding to an angular displacement of the motor shaft 22 relative to a reference motor shaft position. The comparator circuit 14 compares the magnitude of the reference signal with the magnitude of the transducer electrical signal to generate an output signal having a predetermined amplitude and polarity. The output signal from the comparator 14 is conducted from a comparator output terminal 26 to an input terminal 28 of a motor direction control circuit 30. The motor direction control circuit 30 is arranged, as described below, to respond to the comparator output signal to provide an output motor control signal suitable for operating the motor 24 to rotate the motor drive shaft 22 in a desired direction. The motor control signal from the motor direction control circuit 30 is conducted from an output 32 to a motor input terminal 34 or motor control windings shown in FIG. 2 and described below.

Unlike prior art motor control circuits, a feedback circuit 36 is coupled between the comparator output terminal 26 and the comparator input terminal 20. The feedback circuit 36 is arranged to cause the comparator circuit 14 to oscillate at a relatively high frequency when a voltage level difference between signals at terminals 12 and 20 is substantially equal to or less than a predetermined magnitude. The motor direction control circuit 30 is arranged to be unresponsive to a relatively high frequency input signal, thereby stopping motor 24 operation.

Figure 2:
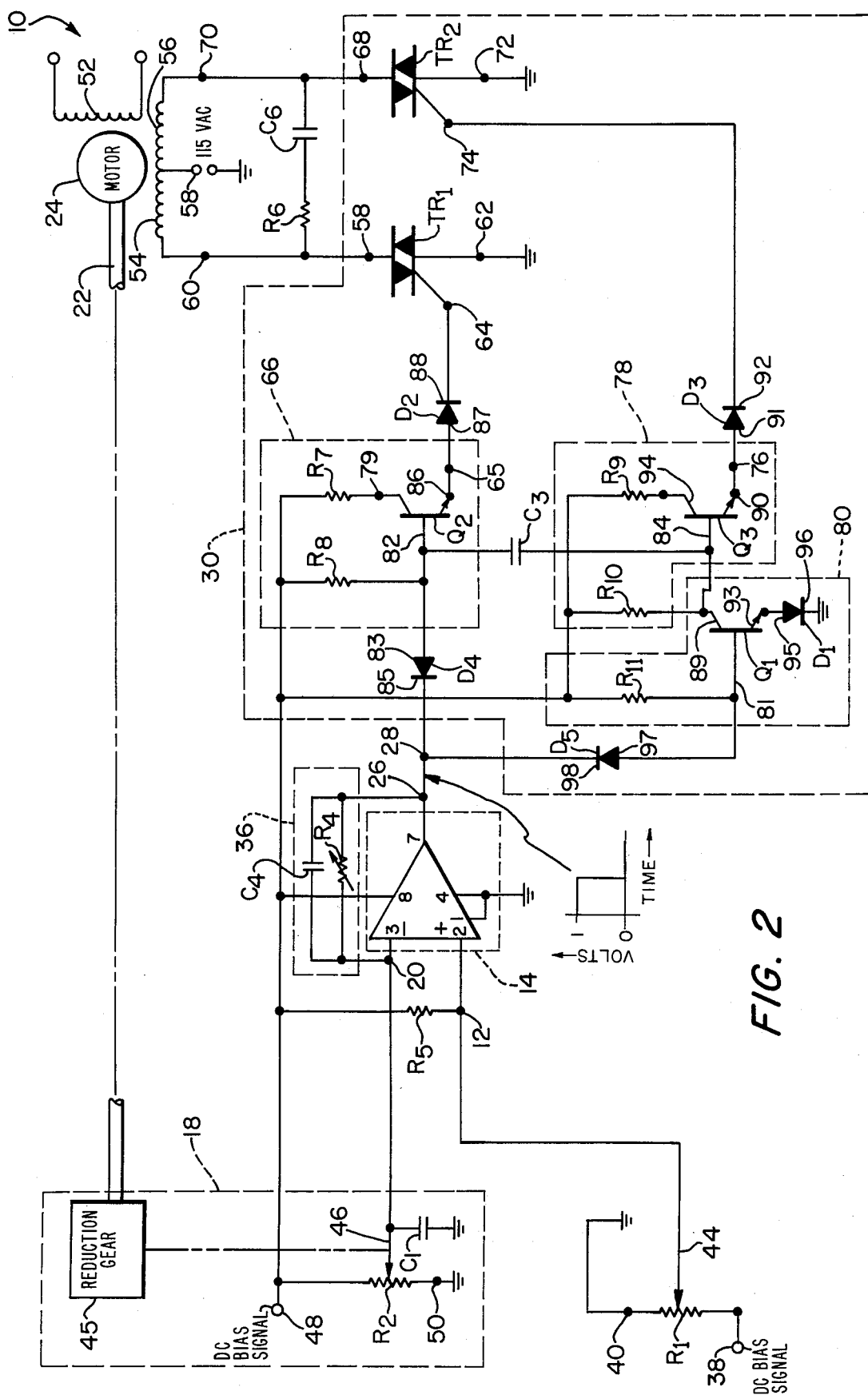
FIG. 2 is a schematic diagram of a motor control circuit arranged according to one embodiment of the invention.

Referring to FIG. 2, there is shown a more detailed schematic of the motor control circuit 10 shown in FIG. 1. For convenience, reference numbers indicating elements in FIG. 1 are used to indicate like elements in FIG. 2. The reference signal is provided by a direct current (DC) signal of 5 volts, for example, from a source, not shown, coupled to a first terminal 38 of a variable resistor, $R_1$. The resistor $R_1$ has a second terminal 40 at ground or reference potential and an adjustble sliding contact or wiper arm 44 coupled to the first input or non-inverting terminal 12 of the comparator circuit 14. As known in the art, the magnitude of the reference signal coupled to the comparator input terminal 12 may be varied by adjusting the sliding contact 44 to vary the resistance provided by $R_1$.

A DC signal from the position transducer 18 is coupled to the comparator second input or inverting terminal 20. An example of the position transducer 18 is a reduction gear 45 connected to the motor shaft 22 and a wiper arm 46 of a variable resistor $R_2$ having a first terminal 50 connected to ground potential and a second terminal 48 coupled to a DC source, not shown. The reduction gear 45 may be gear train arranged to lower the rotational speed of the motor shaft 22 to a speed suitable for adjusting the wiper arm 46 of resistor $R_2$. A DC signal of 15 volts, for example, from a source, not shown, is coupled to the second terminal 48 of the resistor $R_2$. A conductive path for DC signals from terminal 48 to terminal 20 is provided by connecting the wiper arm 46 of resistor $R_2$ to the second input terminal 20 of the comparator circuit 14. The magnitude of the DC signal coupled to terminal 20 may be varied by adjusting the resistance provided by $R_2$. The reduction gear and resistor $R_2$ are arranged so that as the motor shaft 22 rotates in a predetermined direction, the reduction gear 45 moves the wiper arm 46 to change the resistance provided by the resistor $R_2$ in proportion to the direction and magnitude of the motor shaft 22 rotation from a reference motor shaft 22 position. Thus, the magnitude of the DC signal coupled to the second input terminal 20 of the comparator circuit 14 is proportional to displacement of the motor shaft 22 from a reference position.

The reversible motor 24 is illustrated, by way of example, as an alternating current (AC) split phase induction motor having a secondary winding 52 energized by an alternating signal substantially 90 degrees out of phase from an alternating signal coupled between a primary or motor control winding center tap 58 and ground. Other reversible motors such as a shaded-pole-type induction motor may also be used. A network comprising a serial connection of a capacitor $C_6$ and a resistor $R_6$ is connected across the motor control windings 54 and 56. The capacitor $C_6$ provides a desired phase shift for motor 24 operation and the resistor $R_6$ protects Triacs $TR_1$ and $TR_2$, described below, from current discharged by capacitor $C_6$.

The motor direction control circuit 30 includes a forward drive Triac, $TR_1$, and a reverse drive Triac, $TR_2$, arranged to provide a selected path to ground for AC signals coupled to center tap 58. The forward drive Triac $TR_1$ has a first main terminal 58 coupled to end 60 of the motor control winding 54, a second main terminal 62 coupled to ground or reference potential and a gate terminal 64 coupled to an output terminal 65 of a forward drive current amplifier 66. The motor shaft 22 is caused to rotate in a forward or clockwise direction when the forward drive Triac $TR_1$ is in a low impedance state from terminal 58 to terminal 62 and the AC signal at the center tap 58 is conducted through the winding 54 and $TR_1$ to ground.

The reverse drive Triac $TR_2$ has a first main terminal 68 coupled to end 70 of the motor control winding 56, a second main terminal 72 coupled to ground or reference potential and a gate terminal 74 coupled to an output terminal 76 of a reverse drive current amplifier 78. The motor shaft 22 is caused to rotate in a reverse or counter-clockwise direction when the reverse drive Triac $TR_2$ is in a low impedance state from terminal 68 to terminal 72 and the AC signal at the center tap 58 is conducted through the winding 56 and $TR_2$ to ground.

A Triac is a semiconductor bidirectional thyristor switch that conducts or is in a low impedance state with either polarity of an AC signal applied across Triac first and second terminals and requires an input or control pulse coupled to a Triac gate terminal for each polarity or reversal of the applied AC signal. In the motor control circuit shown in FIG. 2, the Triacs $TR_1$ and $TR_2$ are rendered conductive or operated in a low impedance state by control pulses coupled to the forward Triac gate terminal 64 and the reverse Triac gate terminal 74 from the current amplifiers 66 and 78, respectively.

An example of the forward drive current amplifier 66 is a circuit comprising resistors $R_7$ and $R_8$ and transistor $Q_2$. A collector terminal 79 of the transistor $Q_2$ is coupled to terminal 48 via resistor $R_7$. A base terminal 82 of the transistor $Q_2$ is coupled to terminal 48 via resistor $R_8$ and to an anode terminal 94 of a diode $D_4$ having a cathode terminal 85 coupled to the comparator output terminal 26. The diode $D_4$ is arranged to provide a low impedance path for current signals conducted to terminal 26 from base terminal 82 and a high impedance path for current signals conducted to terminal 82 from terminal 26 in response to signals from the comparator circuit 14. Thus, the diode $D_4$ provides a unidirectional conductive path for current signals from terminal 82 to terminal 26. An emitter terminal 86 of the transistor $Q_2$ is coupled to an anode terminal 87 of a diode $D_2$ having a cathode terminal 88 coupled to the Triac gate terminal 64. The diode $D_2$ is arranged to provide a low impedance path for current signals conducted from the emitter terminal 86 to the Triac gate terminal 64 and a high impedance path for current signals conducted from the terminal 64 to the terminal 86. Thus, the diode $D_2$ provides a unidirectional conductive path for current signals from emitter terminal 86 to Triac gate terminal 64. A DC bias signal coupled to terminal 48 is conducted to the transistor $Q_2$ via resistor $R_7$ and $R_8$ so that the transistor $Q_2$ operates in a current amplifying mode for providing a current signal to the Triac gate terminal 64 in response to a comparator signal at a relatively high voltage level coupled to the cathode terminal 85 of diode $D_4$.

An example of the reverse drive current generator 78 is a circuit comprising resistors $R_9$ and $R_{10}$ and transistor $Q_3$. A collector terminal 83 of the transistor $Q_3$ is coupled to terminal 48 via resistor $R_9$. A base terminal 84 of the transistor $Q_3$ is coupled to terminal 48 via resistor $R_{10}$ and to a collector terminal 89 of a transistor $Q_1$. An emitter terminal 90 of the transistor $Q_3$ is coupled to an anode terminal 91 of a diode $D_3$ having a cathode terminal 92 coupled to the reverse drive Triac gate terminal 74. The diode $D_3$ is arranged to provide a low impedance path for current signals conducted from the emitter terminal 90 to the Triac gate terminal 74 and a high impedance path for current signals conducted from the gate terminal 74 to the emitter terminal 90. Thus, the diode $D_3$ provides a unidirectional conductive path for current signals conducted from the emitter terminal 90 to the gate terminal 74. A DC bias signal coupled to terminal 48 is conducted to the transistor $Q_3$ via resistors $R_9$ and $R_{10}$ so that the transistor $Q_3$ operates in a current amplifying mode for providing a current signal to the Triac gate terminal 74 in response to a relatively high voltage level signal coupled to base terminal 84 from an inverter circuit 80 described below.

The control pulses generated by the comparator circuit 14 are logic pulses or logic voltage levels. In this embodiment, binary number "1" refers to a relatively high logic voltage level provided by the comparator circuit 14 when the voltage level at compartor terminal 12 exceeds the voltage level at comparator terminal 20. The binary number "0" refers to a relatively low logic voltage level provided by the comparator circuit 14 when the voltage level at comparator terminal 20 exceeds the voltage level at comparator terminal 12. The magnitude of the voltage levels corresponding to "1" and "0" depend, as known in the art, on bias signal level and the type of circuits comprising the elements of the comparator circuit 18. The current amplifiers 66 and 78 operate to conduct current to the Triac gate terminals 64 and 74, respectively, in response to a voltage level of "1".

An inverter circuit 80 is serially connected between the reverse drive current amplifier 78 and the motor direction control circuit input terminal 28. The inverter circuit 80 is arranged, as known in the art, to provide an output signal of substantially equal magnitude and opposite algebraic sign relative to the input signal coupled to terminal 28. An example of the inverter circuit 80 is a circuit comprising resistor $R_{11}$, diode $D_1$, and transistor $Q_1$. A collector terminal 89 of the transistor $Q_1$ is coupled to the terminal 48 via the resistor $R_{10}$. A base terminal 81 of the transistor $Q_1$ is coupled to the terminal 48 via resistor $R_{11}$ and an anode terminal 97 of a diode $D_5$ having a cathode terminal 98 coupled to terminal 28. The diode $D_5$ is arranged to provide a low impedance path for current signals conducted to terminal 26 from base terminal 81 and a high impedance path for current signals conducted to base terminal 81 from terminal 26. Thus, the diode $D_5$ provides a unidirectional conductive path for current signals from base terminal 81 to terminal 26. An emitter terminal 93 of the transistor $Q_1$ is connected to an anode terminal 95 of a diode $D_1$ having a cathode terminal 96 coupled to ground. Under operating conditions, the diode $D_1$ is arranged to provide a desired voltage drop from base terminal 81 to ground. The resistance of $R_{10}$ and $R_{11}$ is selected to provide a suitable bias signal to operate the transistor $Q_1$ in a switching mode for conducting current from terminal 89 to terminal 84 in response to a DC bias signal coupled to terminal 48 and a comparator signal at a "0" voltage level coupled to the cathode terminal of diode $D_5$.

Under operating conditions, a comparator circuit output signal is simultaneously conducted to the cathode terminal 85 of diode $D_4$ and the cathode terminal 98 of diode $D_5$ and the transistors $Q_1$, $Q_2$, and $Q_3$ are suitably biased by a portion of the bias signal coupled to terminal 48. The diodes $D_4$ and $D_5$ are in a high impedance or non-conducting state when a comparator output voltage level of "1" is coupled to the cathode terminals 85 and 98. When the diode $D_4$ is in a high impedance state, the transistor $Q_2$ is biased to be in a current amplifying mode for providing a current signal of sufficient amplitude to operate the Triac $TR_1$ in a low impedance state from terminal 58 to terminal 62. However, when the diode $D_5$ is in a high impedance state, the inverter circuit 80 provides a "0" voltage level signal to the base terminal 84 causing the transistor $Q_3$ and the reverse drive Triac $TR_2$ to be operated in a high impedance state. Thus, when the Triac $TR_1$ is in a low impedance state, the Triac $TR_2$ is in a high impedance state. An AC signal coupled to the center tap 58 is conducted by the control winding 54 and the Triac $TR_1$ to ground and the motor 24 rotates the shaft 22 in a clockwise direction until the comparator circuit 14 oscillates to provide an output signal having a magnitude which rapidly varies between the "0" and "1" voltage levels to substantially stop motor 24 operation.

The diodes $D_4$ and $D_5$ are in a low impedance or current conducting state when a comparator output voltage level of "0" is coupled to the cathode terminals 85 and 98. When the diode $D_4$ is in a low impedance state, the transistor $Q_2$ and the Triac $TR_1$ are operated in a high impedance state. When the diode $D_5$ is in a low impedance state, the inverter circuit 80 provides a "1" voltage level signal to terminal 84 sufficient to operate the transistor $Q_3$ in a current amplifying mode to provide a current signal of sufficient amplitude to operate the reverse drive triac $TR_2$ in a low impedance state. An AC signal coupled to center tap 58 is then conducted by the control winding 56 and the Triac $TR_2$ to ground and the motor 24 rotates the shaft 22 in a counter-clockwise direction until the comparator circuit 14 oscillates to substantially stop motor 24 operation.

The Triacs $TR_1$ and $TR_2$ are selected from a class of Triacs having a relatively slow response time. Thus, when the comparator circuit 14 oscillates at a high frequency, the current amplifiers 66 and 78 respond in turn and provide relatively high frequency control pulses to the Triac gate terminals 64 and 74. The magnitude of the control pulses rapidly vary between a maximum and minimum level at a frequency substantially determined by the comparator frequency of oscillation. The Triacs $TR_1$ and $TR_2$ fail to respond to the high frequency gate signals or control pulses and simultaneously operate in a high impedance state substantially preventing the conduction of AC current through the motor control windings 54 and 56, thereby stopping the operation of motor 24. However, if one of the Triacs is in a low impedance state before the comparator circuit 14 oscillates, a high impedance signal may instantaneously operate the second Triac in a low impedance state before the first Triac is triggered to operate in a high impedance state. This simultaneous operation of the Triacs $TR_1$ and $TR_2$ in a low impedance state results in Triac burn out.

Means for preventing simultaneous current conduction by the Triacs $TR_1$ and $TR_2$ include a capacitor $C_3$ coupled between the base terminals 82 and 84 of the transistors $Q_2$ and $Q_3$, respectively. The capacitor $C_3$ provides a delay time sufficient to allow a conducting Triac to revert to a non-conducting or high impedance state before the other Triac conducts.

As discussed above, the comparator circuit 14 compares the magnitude of the reference signal coupled to terminal 12 with the magnitude of the position feedback signal from the position transducer 18 coupled to terminal 20 to generate an output signal having a predetermined amplitude and polarity. An example of a suitable comparator circuit 14 is further described in Chapter 15 of *Pulse and Digital Circuits*, by Jacob Millman and Herbert Taub, published in 1965 by McGraw-Hill Book Company. The comparator circuit 14 oscillates when the feedback circuit 36 comprising a parallel combination of a capacitor $C_4$ and a variable resistor $R_4$ is connected across comparator input terminal 26. The feedback circuit 36 provides an unstable condition for comparator circuit operation when the voltage difference between the signals coupled to comparator terminals 12 and 20 is substantially equal to a selected voltage level, such as 5 millivolts. The selected voltage level is substantially determined by a voltage divider circuit comprising the resistor $R_4$ and a resistor $R_5$. The resistor $R_5$ is connected between terminal 48 and comparator terminal 12. The feedback circuit 36 is arranged to reduce the level of the DC signal at comparator terminal 20 by providing a parallel conductive path to terminal 26 when the comparator output signal is at a "0" voltage level. As described above, the comparator circuit 14 provides an output signal at a "1" voltage level when the voltage level at terminal 20 is lower than the voltage level at terminal 12. The feedback circuit 36 impedance is selected to be high so that an output signal at a "1" voltage level permits the voltage level at terminal 20 to rise above the voltage level at terminal 12. The comparator circuit 14 responds to the increased voltage level at terminal 20 to provide an output signal at a "0" voltage level. The cycle repeats itself at a frequency substantially equal to the response time of the comparator circuit 14 when the voltage difference between terminals 12 and 20 is substantially equal to the selected voltage level described above.

A working model of the circuit shown in FIG. 2 was constructed using the component types and values illustrated in the following table.

TABLE

| COMPONENT | TYPE AND VALUE |
|---|---|
| $R_1$ | 50 KΩ |
| $R_2$ | 50 KΩ |
| $R_4$ | 250 KΩ |
| $R_5$ | 22 KΩ |
| $R_6$ | 3.3 Ω, 1 watt |
| $R_7$ | 2.7 KΩ |
| $R_8$ | 47 KΩ |
| $R_9$ | 2.7 KΩ |
| $R_{10}$ | 47 KΩ |
| $R_{11}$ | 47 KΩ |
| $C_1$ | .001 mf |
| $C_3$ | .1 mf |
| $C_4$ | .001 mf |
| $C_6$ | .8 mf |
| $D_1$ | 1N914 |
| $D_2$ | 1N914 |
| $D_3$ | 1N914 |
| $D_4$ | 1N914 |
| $D_5$ | 1N914 |
| $TR_1$ | RCA 4056 |
| $TR_2$ | RCA 4056 |
| $Q_1$ | 2N697 |
| $Q_2$ | 2N697 |
| $Q_3$ | 2N697 |
| Comparator 14 | LM311 National Semiconductor Corporation |

Figure 3:
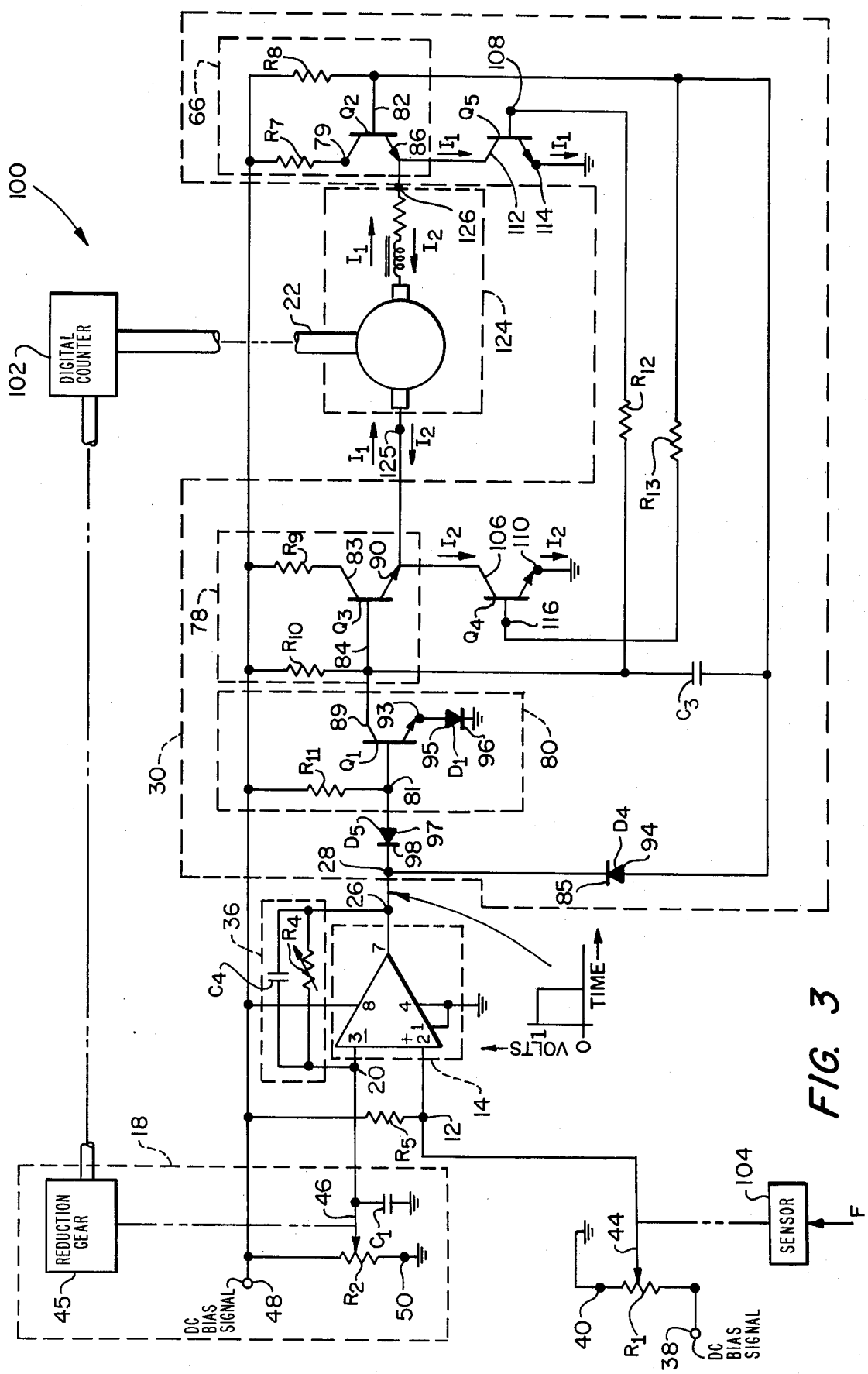
FIG. 3 is a schematic diagram of an electronic scale having a motor control circuit arranged according to the invention.

Referring to FIG. 3, there is shown a schematic of an embodiment of a motor control circuit 100 for an electronic scale having a digital counter 102 arranged to digitally display a measure of force, F, exerted on a prior art sensor 104. For convenience, reference numbers referring to elements in FIGS. 1 and 2 are used to refer to like elements in FIG. 3. The arrangement and function of the comparator circuit 14, feedback circuit 36 and position transducer 18 are described above in reference to FIGS. 1 and 2. However, as an example, motor 124 is illustrated as a reversible DC motor and control circuit 100 is suitably arranged to provide DC signals for operating the motor 124 to rotate the shaft 22 in a desired direction until a desired motor shaft 22 angular displacement from a reference position is reached. Under operating conditions, a force, F, is exerted on the sensor 104 causing a proportional DC signal to be coupled to the comparator terminal 12 for operating the motor 124 until the angular displacement of the shaft 22 is proportional to the force, F. A suitable digital counter 102 is coupled to the motor shaft 22 to provide a visual indication of the motor shaft displacement and thus the force, F. The counter 102 may be calibrated to indicate pounds or any other unit of measure for force.

A DC signal from a source, not shown, is coupled to a first terminal 38 of a variable resistor $R_1$. The resistor $R_1$ has a second terminal 40 at ground or reference potential and an adjustable sliding contact or wiper arm 44 coupled to the first input or non-inverting terminal 12 of the comparator circuit 14. The sensor 104 is coupled to the wiper arm 44 of the resistor $R_1$. The sensor 104 is arranged as known in the art, to vary or adjust the position of the sliding contact 44 and the resistance provided by $R_1$ in proportion to the force, F. Thus, it is apparent that the magnitude of the DC signal coupled to the comparator input terminal 12 is proportional to the force, F.

The position transducer 18 is coupled to the motor shaft 22 to provide a DC signal to the comparator second input or inverting terminal 20 in proportion to the direction and magnitude of the motor shaft 22 displacement from a reference motor shaft 22 position. The comparator circuit 14 responds to the DC signals coupled to terminals 12 and 20 to provide an output signal at output terminal 26. When the difference in magnitude between DC signals coupled to terminals 12 and 20 substantially equal a predetermined magnitude, the feedback circuit 36 provides an unstability causing the comparator circuit 14 to oscillate at a relatively high frequency. The comparator output signals are coupled to a motor direction control circuit 30 arranged to provide DC signals suitable for operating the motor 124 until the comparator 14 oscillates. As an example, the DC motor 124 operates to rotate the motor shaft 22 in a clockwise direction in response to a DC signal conducted from motor terminal 125 to motor terminal 126. Likewise, a DC current signal conducted from motor terminal 126 to motor terminal 125 operates the motor 124 to rotate the shaft 22 in a counter-clockwise direction. It will be appreciated that the DC motor 124 is unresponsive to a high frequency alternating polarity signal coupled to the motor terminals 125 and 126. Thus, when the comparator 14 oscillates at a relatively high frequency, causing a rapid change in polarity of the DC motor signals coupled to the motor terminals 125 and 126, the motor 124 operation is stopped and the digital counter 102 visually displays an indication of the motor shaft 22 displacement calibrated as a measure of force exerted on the sensor 104.

The motor direction control circuit 30 comprises the inverter circuit 80, forward drive current amplifier 66 including transistor $Q_4$ and reverse drive current amplifier 78 including transistor $Q_5$. The motor control circuit 30 may also include diodes $D_4$ and $D_5$ arranged to provide a unidirectional conductive path for current signals as described above in reference to FIG. 2. The forward and reverse drive current amplifiers 66 and 78, respectively, and the inverter circuit 80 are arranged to provide DC signals to the motor terminals 125 and 126 for operating the motor 124 in response to the comparator 14 output signal. The reverse drive current amplifier 78 is arranged to have a transistor $Q_3$ with an emitter terminal 90 coupled to the motor terminal 125 and a base terminal coupled to a base terminal 108 of the transistor $Q_5$ via a resistor $R_{12}$. The transistor $Q_5$ has a collector terminal 112 coupled to the motor terminal 126 and an emitter terminal 114 coupled to ground potential. As described above in reference to FIG. 2, the comparator 14 provides an output signal which may be described in terms of the logic voltage levels "1" and "0". A comparator output signal at a "1" voltage level occurs when the voltage at the comparator terminal 12 exceeds the voltage level at the comparator terminal 20. A comparator output signal at a "0" voltage level occurs when a voltage level at the comparator terminal 12 is less than the voltage level at the comparator terminal 20. A comparator output signal having a voltage level of "1" at terminal 28 causes the inverter circuit 80 to provide a "0" voltage level at the base terminals 84 and 108 of the transistors $Q_3$ and $Q_5$, respectively. The transistors $Q_3$ and $Q_5$ are thus operated in a high impedance or "OFF" state. However, a voltage level of "0" at terminal 28 causes the inverter circuit 80 to provide a "1" voltage level at the base terminals 84 and 108 of the transistors $Q_3$ and $Q_5$, respectively, to operate the reverse drive current amplifier 48 in a current amplifying mode and thus providing a current signal $I_1$ at the motor terminal 125 to terminal 126. The current signal $I_1$ is conducted by the motor 124 from terminal 125 to terminal 126. The transistor $Q_5$ is arranged to operate in an "ON" or current conducting state in response to a "1" voltage level signal at base terminal 108. The current signal $I_1$ at motor terminal 126 is conducted to ground via the transistor $Q_5$ since the collector terminal 112 of the transistor $Q_5$ is connected to the motor terminal 126 and the emitter terminal 114 of the transistor $Q_5$ is coupled to ground potential. The current signal $I_1$ causes the motor 124 to rotate the shaft 22 in a counter-clockwise direction until the comparator 14 oscillates to provide an output signal having a magnitude rapidly changing between the "0" and "1" voltage levels.

The forward drive current amplifier 66 is arranged to have a transistor $Q_2$ with an emitter terminal 86 coupled to the motor terminal 126 and a base terminal 82 coupled to a base terminal 116 of the transistor $Q_4$ via a resistor $R_{13}$. The transistor $Q_4$ has a collector terminal 106 coupled to the motor terminal 125 and an emitter terminal 110 coupled to ground potential. A comparator output signal having a voltage level of "0" at terminal 28 causes the transistors $Q_2$ and $Q_4$ to be in a high impedance of "OFF" state. However, a comparator output signal having a voltage level of "1" operates the forward drive current amplifier 66 in a current amplifying mode to provide a current signal $I_2$ at the motor terminal 126. The current signal $I_2$ is conducted by the motor 124 from motor terminal 126 to motor terminal 125. The transistor $Q_4$ is arranged to operate in an "ON" or current conducting state in response to a "1" voltage level signal at terminal 28. The current signal $I_2$ at motor terminal 125 is conducted to ground via the transistor $Q_4$ since the collector terminal 106 of the transistor $Q_4$ is coupled to the motor terminal 125 and the emitter terminal 110 of the transistor $Q_4$ is coupled to ground potential. The current signal $I_2$ causes the motor 124 to rotate the shaft 22 in a clockwise direction until the comparator oscillates to provide a rapid change in the polarity of the DC motor signals coupled to the motor terminals 125 and 126.

Thus, the motor control circuit 100 is arranged to respond to an electrical signal proportional to the force, F, exerted on the sensor 104 to provide DC signals suitable for operating the motor 124 to rotate the shaft 22 until the comparator 14 oscillates. The comparator 14 oscillates at a relatively high frequency when the difference in magnitude between the transducer and sensor output electrical signals substantially equals a predetermined magnitude. The motor 124 operation stops when the comparator 14 oscillates and the counter 102 displays an indication of the motor shaft 22 displacement and the force, F, exerted on the sensor 104.

As known in the prior art, a rapid change in polarity of the DC motor signals coupled to the motor terminals 125 and 126 can demagnetize permanent magnets, not shown, in the DC motor 124 if such rapid polarity change occurs over an extended period of time. Means for preventing the demagnetization of the DC motor magnets when the comparator 14 oscillates and rapidly changes the polarity of the DC motor signals and the direction of current conduction through the motor 124 include a capacitor $C_3$ coupled between the base terminals 82 and 84 of the transistors $Q_2$ and $Q_3$, respectively. The capacitor $C_3$ provides a predetermined time delay for the polarity change of the DC motor signals or a change in direction of current conduction through the motor 124. When the comparator 14 oscillates the time delay provided by the capacitor $C_3$ is sufficient to prevent demagnetization of the permanent motor magnets.

A preferred embodiment of the invention has been shown and described. Various other embodiments and modifications thereof will be apparent to those skilled in the art. For example, while the preferred embodiment describes a position transducer having a reduction gear serially connected between the motor shaft 22 and wiper arm 46, other means for sensing the position of the motor shaft 22 relative to a reference shaft position and generating a proportional electrical signal may be used to implement the invention. Thus, many other arrangements can readily be devised in accordance with the disclosed principle of the invention by those skilled in the art.

What is claimed as new and desired to be secured by Letters Patent of the United States is:

1. A motor control circuit for controlling operation of a reversible motor having a shaft and motor control windings comprising:

position transducer means coupled to said motor shaft for providing an output electrical signal proportional to a displacement of said motor shaft from a reference motor shaft position;

comparator means having first and second input terminals and an output terminal, said comparator means being arranged to compare magnitude of a reference signal coupled to said comparator first input terminal with magnitude of said position transducer output electrical signal coupled to said comparator second input terminal to provide a motor direction control signal;

feedback means coupled between said comparator second input terminal and said comparator output terminal to cause said comparator means to oscillate to stop said motor operation when a difference in magnitude between said reference and transducer electrical signals is substantially equal to a predetermined magnitude; and motor direction control means coupled between said comparator output terminal and said motor control windings, said motor direction control means being arranged to generate motor control signals for controlling said motor operation in response to said comparator means output signal.

2. A motor control circuit in accordance with claim 1, wherein said position transducer means comprises:
reduction gear means coupled to said motor shaft for reducing rotational speed of said motor shaft; and
variable resistance means having a wiper arm coupled to said reduction gear means for changing resistance of said variable resistor means in proportion to said motor shaft displacement and direction of said motor shaft rotation.

3. A motor control circuit in accordance with claim 1, wherein said feedback means comprises a parallel combination of a resistor and a capacitor coupled from said comparator second terminal to said comparator output terminal.

4. A motor control circuit in accordance with claim 1, further including means coupled to said shaft for visually displaying a measure of said motor shaft displacement.

5. A motor control circuit for controlling operation of a reversible motor having a shaft and motor control windings comprising:
position transducer means coupled to said motor shaft for providing an output electrical signal proportional to a displacement of said motor shaft from a reference motor shaft position;
comparator means having first and second input terminals and an output terminal, said comparator means being arranged to compare magnitude of a reference signal coupled to said comparator first input terminal with magnitude of said position transducer output electrical signal coupled to said comparator second input terminal to provide a motor direction control signal;
feedback means coupled between said comparator second input terminal and said comparator output terminal to cause said comparator means to oscillate to stop said motor operation when a difference in magnitude between said reference and transducer electrical signals is substantially equal to a predetermined magnitude;
motor direction control means coupled between said comparator output terminal and said motor control windings, said motor direction control means being arranged to generate motor control signals for controlling said motor operation in response to said comparator means output signal, said motor direction control means having forward direction control means with an input terminal coupled to said comparator means output terminal and an output terminal coupled to a first end of said motor control windings, said forward direction control means responding to said comparator means output signal to operate said motor to rotate said shaft in a forward direction; and
reverse direction control means having an input terminal coupled to said comparator means output terminal and an output terminal coupled to a second end of said motor control windings, said reverse direction control means responding to said comparator means output signal to operate said motor to rotate said shaft in a reverse direction.

6. A motor control circuit in accordance with claim 5, further including delay means coupled between said forward direction control means and said reverse direction control means.

7. A motor control circuit in accordance with claim 6, wherein said delay means includes a capacitor.

8. A motor control circuit according to claim 5, wherein said forward direction control means comprises:
first current amplifier means having an input terminal and an output terminal, said first current amplifier means providing an output signal in response to a predetermined comparator means output signal coupled to said first current amplifier means input terminal; and
first switching means having a first, second, and third terminals, said first terminal of said first switching means being coupled to said first end of said motor control windings, said second terminal of said first switching means being coupled to a reference potential and said third terminal of said first switching means being coupled to said first current amplifier means output terminal, said first switching means providing a low impedance from said first terminal to said second terminal of said first switching means in response to a predetermined first current amplifier output signal.

9. A motor control circuit in accordance with claim 8, wherein said first switching means is a bidirectional triode thyristor.

10. A motor control circuit in accordance with claim 8, wherein said first switching means is a transistor.

11. A motor control circuit according to claim 5, wherein said reverse direction control means comprises:
inverter means having an input terminal coupled to said comparator means output terminal for providing an output signal of substantially equal magnitude and opposite algebraic signal relative to said comparator means output signal coupled to said inverter means input terminal;
second current amplifier means having an input terminal and an output terminal, said second current amplifier means providing an output signal in response to a predetermined inverter means output signal; and
second switching means having first, second, and third terminals, said first terminal of said second switching means being coupled to said second end of said motor control windings, said second terminal of said second switching means being coupled to a reference potential and said third terminal of said second switching means being coupled to said second current amplifier means output terminal, said second switching means providing a low impedance from said first terminal to said second terminal of said second switching means in response to a predetermined second current amplifier output signal.

* * * * *

UNITED STATES PATENT OFFICE
CERTIFICATE OF CORRECTION

PATENT NO. : 4,055,788
DATED : October 25, 1977
INVENTOR(S) : William Hancock Greeley, Jr.

It is certified that error appears in the above-identified patent and that said Letters Patent are hereby corrected as shown below:

Column 1, line 26, change "to" to --of--.

Column 6, line 62, change "1965" to --1956--.

Signed and Sealed this

Seventh Day of March 1978

[SEAL]

Attest:

RUTH C. MASON
Attesting Officer

LUTRELLE F. PARKER
Acting Commissioner of Patents and Trademarks